United States Patent [19]

Howard et al.

[11] 4,280,849

[45] Jul. 28, 1981

[54] AQUEOUS DISPERSIONS

[75] Inventors: Peter B. Howard, Yarm; Peter J. Broadhurst, Northallerton, both of England

[73] Assignee: Tioxide Group Limited, Cleveland, England

[21] Appl. No.: 120,780

[22] Filed: Feb. 12, 1980

[30] Foreign Application Priority Data

Mar. 6, 1979 [GB] United Kingdom ............... 07903/79

[51] Int. Cl.$^3$ ............................................. C09C 1/36
[52] U.S. Cl. ...................................... 106/300; 106/309
[58] Field of Search ................................. 106/300, 309

[56] References Cited

U.S. PATENT DOCUMENTS 3,849,151 11/1974 Abercrombie ........................ 106/309

*Primary Examiner*—James Poer

[57] ABSTRACT

Aqueous pastes have been prepared by dispersing dried particulate material in water in the presence of a dispersing agent.

A new process for the manufacture of aqueous pastes involves two-stage filtration in which a first stage filter cake is mixed with a dispersing agent in an amount sufficient to render the cake free-flowing which is then subjected to a second stage pressure filtration and the cake is then homogenized.

Preferably the cake is of titanium dioxide and the cake from the first filtration is mixed with the dispersing agent in a sand mill. A membrane pressure filter is preferably used in the first and second filtration stages. During homogenization preferably a further amount of the dispersing agent is mixed with the filter cake. Aqueous paste prepared by this new process can have solids contents in excess of 70% by weight.

19 Claims, No Drawings

AQUEOUS DISPERSIONS

This invention relates to aqueous dispersions of particulate solid materials and particularly to a process for their manufacture.

According to the present invention a process for the manufacture of an aqueous paste of a solid particulate material having a desired viscosity comprises subjecting an aqueous dispersion of said solid particulate material to a two-stage filtration process in which a filter cake obtained from the first filtration stage is mixed with a dispersing agent for the solid particulate material in an amount which is sufficient to render the cake free-flowing and the free-flowing dispersion so obtained is then subjected to the second-stage filtration employing a pressure filter to produce a filter cake which is then homogenised in a mixer until a recovered aqueous paste having the desired viscosity is obtained.

The process of the present invention produces an aqueous paste of a solid material having a chosen viscosity and solids content. Such pastes are often referred to as slurries and comprise the solid particulate material and water. These pastes are of increasing importance in industry since being already associated with water they do not require reformation in a subsequent manufacturing process. For instance it is possible to employ such an aqueous paste of a pigment directly in the manufacture of an aqueous paint composition rather then employing the hitherto usual initial step of dispersing a dry pigment in water.

The process of the present invention is of particular value for the manufacture of pastes having a solids content in excess of 60% by weight, and often exceeding 70% by weight depending on the particular type of solid material. The process is of value for any type of solid particulate material which is used subsequent to manufacture in the form of an aqueous paste or slurry. The process is of particular use in the manufacture of aqueous pastes or slurries of titanium dioxide pigments which are subsequently used in the manufacture of aqueous emulsion paints.

The process of the invention involves a two-stage filtration process in which the second-stage filtration process is effected on a pressure filter.

A pressure filter is a filter in which super atmospheric pressure is applied to the material being filtered to express liquid from the filter cake and thereby produce a filter cake of high solids content. The pressure may be applied in different ways, for instance by means of a flexible membrane or by moveable plates or by means of rollers. The actual operating conditions of the pressure filter depend on the particular type of filter being used and on the particular solid particulate material being filtered. The pressure applied may range from say one or two bars gauge to 1000 bars gauge or greater. One particular form of membrane pressure filter will operate satisfactorily at up to 16 bars gauge while another type may be operated at say 600 bars gauge. The thickness of the filter cake also depends on the particular choice of pressure filter and on the particular solid material forming the cake. With one form of membrane pressure filter operating at up to 16 bars gauge the cake thickness may be up to 35 mm when titanium dioxide pigment is being filtered.

Generally the higher the squeeze pressure employed for a particular filter the higher solids content cake is obtained. Usually for titanium dioxide the solids content of the cake is at least 60% by weight and advantageously at least 70% by weight. Most preferably the process of the invention is carried out to produce a titanium dioxide pigment paste having a solids content of from 70% to 76% by weight.

In the first filtration stage of the process of the invention an aqueous dispersion of the solid particulate material is filtered to form a filter cake. If desired this cake may be a washed cake and this filtration stage may be, if desired, a filtration stage of a conventional process for the manufacture of the solid particulate material or may be an extra filtration stage in such a process. The first filtration may be carried out on any appropriate filter such as a leaf filter, a rotary drum filter or a filter press. Preferably the first filtration is effected on a pressure filter which may be similar to that used for the second filtration stage. If appropriate both filtration stages may be carried out using the same pressure filter.

The filter cake obtained from the first filtration stage of the process of the invention normally will have a solids content of at least 60%, say from 60–68%, by weight and preferably has a solids content of at least 64% by weight of the solid particulate material. Usually the filtration process is carried out under such conditions that the desired solids content cake is obtained in one filtration operation although as described this filtration operation may include a washing stage if desired.

The cake obtained as a result of the first filtration stage of the process of the invention is then mixed with an amount of a dispersing agent for the particular solid material preferably without the addition of any substantial quantity of water to avoid dilution of the cake. The amount of the dispersing agent added to the cake is at least that required to render the cake fluid, ie free flowing. The particular amount of dispersing agent added will depend on the particular solid particulate material forming the suspension and also, naturally, on the particular nature of the dispersing agent being used. When the solid particulate material is titanium dioxide pigment then it has been found that adding increased amounts of dispersing agent produces fluid suspensions of reduced viscosities but that the viscosity decreases to a minimum value and further addition of dispersing agent greater than that required to produce the minimum viscosity actually produces a suspension in which the viscosity increases. Thus, for titanium dioxide aqueous suspension it is desirable that the amount of dispersing agent added should be at least that sufficient to produce a fluid suspension but not greater than that which produces a suspension having the minimum viscosity.

The cake produced from the first filtration stage may be mixed with the dispersing agent in any suitable mixing device and if desired the mixing can be effected by milling the suspension with the dispersing agent under such conditions that shear is applied to the suspension to mill the particles of solid material being dispersed. Such milling may be effected in a sand mill if desired.

The particular type of dispersing agent employed in the process of the present invention will depend on the particular solid particulate material used to form the aqueous suspension and generally inorganic or organic dispersing agents may be employed although for titanium dioxide pigments it is preferred to use an organic dispersing agent. Examples of inorganic dispersing agents which may be employed are alkali metal silicates such as sodium silicate and inorganic phosphates, eg an alkali metal phosphate such as sodium hexametaphosphate.

Examples of organic dispersing agents which may be employed in the process of the present invention are acrylate dispersing agents such as ammonium polyacrylate and sodium polyacrylate. Alkanolamines such as monoisopropanolamine, or 2-amino-2 methylpropane diol and condensation polymer such as obtained from isobutylene and maleic anhydride.

The filter cake containing the dispersing agent is then subjected to the second stage filtration as described previously herein. The cake produced in the second stage filtration process is then homogenised in a mixer until the aqueous paste or slurry is produced at the desired viscosity. This homogenisation process may be effected, depending on the particular form of the filter cake, in a simple mixing device such as a high speed stirrer or in a mill. Preferably after homogenisation the paste is milled in a sand mill.

Preferably during the homogenisation process a further amount of the dispersing agent is added to the filter cake to reduce the viscosity of the suspension without any substantial reduction of the solids content taking place.

The homogenisation process is carried out until the aqueous paste or slurry has the desired viscosity to be free flowing. The particular aqueous pastes obtained by the process of the invention on recovery from the homogeniser are stable and can be transported in bulk containers and are easily discharged therefrom.

The process of the present invention is particularly useful for the manufacture of aqueous pastes of titanium dioxide pigments which are subsequently to be used in the manufacture of aqueous emulsion paints or other products in which the use of an aqueous suspension of the pigment is required. The titanium dioxide pigments may be anatase titanium dioxide pigments or rutile titanium dioxide pigments which are prepared either by the well known sulphate process or chloride process. The pigments may be coated or uncoated although usually the pigments will have been subjected to coating with one or more hydrous metal oxides, silicates and/or phosphates prior to the first filtration stage of the present process. The process of the invention is particularly useful in the manufacture of aqueous suspensions from coated titanium dioxide pigments which have been coated by a wet coating process since the first filtration stage of the process of the invention may be the final filtration process stage of the coating operation.

One form of titanium dioxide pigment which has been found to be particularly useful in the manufacture of aqueous emulsion paints is a rutile titanium dioxide pigment having a coating of a hydrous oxide of aluminum and of silicon in which the combined amounts of hydrous oxides of aluminum and of silicon exceed 10% by weight of the total pigment weight. Particularly useful are those titanium dioxide pigments having such coatings in which the amount of hydrous oxide of silicon exceeds that of the hydrous oxide of aluminium.

If desired during the final homogenisation of the suspension other ingredients may be incorporated with the suspension such as fungicides, biocides, anti-foaming agents and other additives which for instance increase the stability, homogenity and thixotropic nature of the aqueous suspension.

The invention is illustrated in the following examples.

EXAMPLE 1

In this Example a membrane pressure filter was used which was manufactured by Mosely Rubber Co Ltd and which consisted of two filter plates with one chamber and was equipped with two inflatable membranes. The filter had a total filtration area of 0.0948 square meters. The width of the cake chamber could be varied by means of spacing members and the filter was equipped with a 3255 filter cloth formed of a polyester sold under the name "Terylene." Initially the cake chamber of the pressure filter was adjusted to have a depth of 35 mm.

Titanium dioxide pigment, which had been subjected to a conventional wet coating process in which there was deposited into association with the pigment particles a hydrous oxide of silicon (1.3% by weight expressed as $SiO_2$ on $TiO_2$) and a hydrous oxide of aluminium (2.5% by weight expressed as $Al_2O_3$ on $TiO_2$), in the form of an aqueous dispersion containing 603 grams per liter $TiO_2$ and at a temperature of 16° C. was fed to the pressure filter for a period of three minutes at an inlet pressure of 5.5 bars gauge. The feed of aqueous suspension was then stopped and the inflatable membranes in the filter inflated to a pressure of 8.96 bars gauge. The cakes of pigment formed in the pressure filter were dewatered for three minutes under this inflation pressure after which time the membranes were deflated, the press opened and the cakes discharged.

The cakes discharged were in the form of a paste having a solids content of 64.8% by weight.

This filtering operation was repeated twice with two further samples of aqueous dispersion of the pigment so that in all three amounts of discharged cakes were obtained.

These three discharged cakes were then placed together in a vessel and broken up manually and then stirred with an aqueous solution of ammonium polyacrylate as dispersing agent. The aqueous solution of polyacrylate contained 40% by weight of ammonium polyacrylate and was added to the mixed cakes in an amount equivalent to 0.3% by weight of ammonium polyacrylate on the weight of pigment. It was observed that stirring of the mixture resulted in the cake becoming a free-flowing dispersion.

The free-flowing dispersion was then filtered on the same membrane pressure filter but prior to filtering the cake chamber depth was reduced to 12 mm by removal from the filter of appropriate spacing members. The temperature of the fluid dispersion fed to the filter was 17° C. and the inlet pressure was 5.5 bars gauge. The free-flowing dispersion was fed to the filter for a period of approximately three minutes and then the feed was stopped and the internal membranes were inflated to a pressure of 9.3 bars gauge. This pressure was maintained for a period of 5 minutes to dewater the filter cakes after which time the pressure was released, the press opened and the cake discharged.

The cake discharged had a solids content of 74.7% by weight.

The cake was then broken up in a vessel to which there was then added a further amount of the aqueous solution of ammonium polyacrylate sufficient to introduce ammonium polyacrylate in an amount of 0.5% by weight of the pigment. Stirring of the mixture caused the cake to become free-flowing. The free-flowing dispersion of paste was then homogenised in a high-speed impeller mill for 30 minutes at 3000 rpm to produce a stable, uniform slurry or paste of the titanium dioxide.

A sample of the so obtained slurry was then milled in a sand mill for 60 minutes at 1170 rpm and when this milled slurry was incorporated in a paint, the paint exhibited a significant improvement in gloss development as compared with a paint prepared from a slurry which had not been subjected to a final sand milling operation.

EXAMPLE 2

In this Example a Schenk membrane pressure filter was used which consisted of 16 filter plates each provided with 2 inflatable membranes and the filter had a total filtration surface area of 4.7 square meters. The filter was fitted with a double weave filter cloth sold under the name "Marsintex 2436." The cake chamber depth was 25 mm and could not be varied.

Titanium dioxide pigment, which had been coated by a conventional wet coating process with hydrous silica (1.3% $SiO_2$ by weight on $TiO_2$) and hydrous alumina (2.5% by weight $Al_2O_3$ by weight on $TiO_2$), in the form of an aqueous dispersion containing approximately 200 grames per liter was heated to a temperature of 44° C. and fed to the pressure filter.

The aqueous dispersion of titanium dioxide pigment was fed to the filter at a pressure of 5 bars gauge for a total period of 8 minutes after which time the feed was stopped and the internal membranes inflated to a pressure of 2 bars gauge for a period of 4 minutes to affect dewatering of the deposited filter cakes. The membranes were then deflated and wash water was then fed through the press at an inlet pressure of 5 bars gauge and at a temperature of 42° C. for a period of 18 minutes. The wash water flow was then stopped and the membranes inflated to a pressure of 13 bars gauge for a period of 2 minutes. The membranes were then deflated, the press opened and the cake discharged.

The discharged cake had a solids content of 65% by weight.

A sample of the discharged cake was then broken up in a vessel and mixed with a dispersing agent as described in Example 1. The dispersed free-flowing dispersion so obtained was then subjected to filtration in the 2nd stage pressure filter as described in Example 1 under similar conditions.

The cake was discharged and a further amount of dispersing agent added as described in Example 1 to produce a free-flowing aqueous paste having properties similar to that obtained in Example 1.

EXAMPLE 3

Titanium dioxide pigment, which had been coated by a conventional wet coating process with hydrous alumina (3.0% by weight of $Al_2O_3$ on $TiO_2$) and hydrous titania (0.75% by weight $TiO_2$ on $TiO_2$), in the form of an aqueous dispersion containing approximately 550 grams per liter of the pigment was filtered using the pressure filter described in Example 1 under similar conditions to those used for the first stage filtration step described in Example 1. It was found that the cake on discharge from the filter had a 65% by weight solids content. As described in Example 1 this first stage filtration operation was carried out on three different samples of the aqueous suspension in order to provide three samples of filter cake.

The cakes were broken up in a vessel and stirred with a 40% aqueous solution of ammonium polyacrylate in an amount sufficient to provide 0.4% by weight of the ammonium polyacrylate by weight of pigment. The mixture was then agitated in a high-speed mixer and it was observed that the cake became free-flowing.

The free-flowing dispersion so obtained was then refiltered in the same membrane filter except that the chamber depth was reduced to 12 mm and the dispersion was fed to the press at a temperature of 20° C. under an inlet pressure of 5.5 bars gauge for a total period of 3 minutes. The feed was then ceased and the internal membranes inflated to a pressure of 9.3 bars gauge and pressure was maintained for a period of 4 minutes. The pressure was then released, the press opened and the contents discharged. The discharged cake had a solids content of 75.7% by weight.

The cake was placed in a suitable vessel, broken up and a quantity of ammonium polyacrylate dispersion agent added equivalent to 0.6% by weight of pigment. The dispersing agent was added as described previously in the form of a 40% by weight aqueous solution. On addition of the dispersing agent with stirring the cake was homogenised using a high-speed impeller mill for a period of 30 minutes at 3000 rpm to produce a stable uniform aqueous paste.

EXAMPLE 4

Titanium dioxide pigment, which had been coated by a conventional wet coating process with hydrous silica (1.3% by weight as $SiO_2$ on $TiO_2$) and hydrous alumina (2.5% by weight as $Al_2O_3$ on $TiO_2$), in the form of an aqueous suspension containing 500 grams per liter of the pigment and having a temperature of 50° C. was filtered in a conventional rotary drum filter to produce a filter cake having a solids content of approximately 60% by weight.

The cake was discharged from the filter and was then mixed with ammonium polyacrylate as dispersing agent in an amount of 0.225% by weight of the pigment. The ammonium polyacrylate was added to the cake in the form of a 40% aqueous solution. Simple agitation of the cake in the presence of the dispersing agent returned the cake to a free-flowing paste.

The free-flowing cake was then filtered in the pressure filter described in Example 1. In this case the pressure filter was adjusted so that the cake chamber had a depth of 33 mm and the dispersed slurry was fed to the pressure filter for a total period of 3 minutes under an inlet pressure of 5.5 bars gauge. Feeding of the dispersed slurry to the pressure filter was then ceased and the internal membranes were inflated to a pressure of 9.3 bars gauge. The pressure was maintained for a period of 12 minutes to dewater the cake. The pressure was then released, the press opened and the contents discharged. The discharge cake had a solids content of 71.2% by weight.

The discharged cake was then broken up in a vessel and ammonium polyacrylate dispersing agent added in an amount of 0.5% by weight of pigment. The ammonium polyacrylate was added in the form of a 40% aqueous solution. On stirring the filter cake reverted to the fluid state. The free-flowing cake was then homogenised using a high-speed impeller mill for a period of 30 minutes at 3000 rpm to produce a stable uniform paste.

What is claimed is:

1. A process for the manufacture of an aqueous paste of solid particulate material having a desired viscosity which comprises subjecting an aqueous dispersion of said particulate material to a two-stage filtration operation in which a filter cake obtained from a first filtration stage is mixed without the addition of any substantial quantity of water with a dispersing agent for the solid particulate material in an amount which is sufficient to render the cake free-flowing and the free-flowing dispersion so obtained is then subjected to the second-stage filtration employing a pressure filter to produce a filter cake which is then homogenised in a mixer until a recovered aqueous paste having the desired viscosity is obtained.

2. A process according to claim 1 in which the particulate material comprises titanium dioxide.

3. A process according to claim 1 in which the filter cake obtained from the first filtration stage has a solids content of at least 60% by weight.

4. A process according to claim 3 in which the filter cake obtained from the first filtration stage has a solids content of at least 64% by weight.

5. A process according to claim 1 in which the first filtration stage is carried out using a pressure filter.

6. A process according to claim 5 in which the pressure filter is a membrane pressure filter.

7. A process according to claim 2 in which the amount of the dispersing agent is not greater than that which produces a suspension having the minimum viscosity.

8. A process according to claim 1 in which the filter cake obtained from the first filtration stage is mixed with said dispersing agent in a mill.

9. A process according to claim 8 in which the mill is a sand mill.

10. A process according to claim 1 in which the second stage filtration employing a pressure filter is carried out using a membrane pressure filter.

11. A process according to claim 1 in which the filter cake obtained from the second filtration stage is homogenised in a high speed stirrer.

12. A process according to claim 1 in which the homogenisation is carried out in a mill.

13. A process according to claim 12 in which the mill is a sand mill.

14. A process according to claim 1 in which during homogenisation a further amount of a dispersing agent is mixed with said filter cake.

15. A process according to claim 1 in which the dispersing agent is an alkali metal silicate.

16. A process according to claim 1 in which the dispersing agent is an alkali metal phosphate.

17. A process according to claim 1 in which the dispersing agent is an organic dispersing agent.

18. A process according to claim 2 in which the titanium dioxide is pigmentary titanium dioxide which has been subjected to a wet coating process.

19. A process according to claim 18 in which the pigmentary titanium dioxide is coated with one or more hydrous metal oxides, silicate and/or phosphates prior to the first filtration stage.

* * * * *